US011831420B2

(12) United States Patent
Kapelevich et al.

(10) Patent No.: US 11,831,420 B2
(45) Date of Patent: Nov. 28, 2023

(54) NETWORK APPLICATION FIREWALL

(71) Applicant: F5 Networks, Inc., Seattle, WA (US)

(72) Inventors: Michael Kapelevich, Raanana (IL); Maxim Zavodchik, Kfar Yona (IL); Tomer Zait, Tel Aviv (IL); Ido Breger, Tel Aviv (IL)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 16/848,012

(22) Filed: Apr. 14, 2020

(65) Prior Publication Data

US 2021/0152598 A1 May 20, 2021

Related U.S. Application Data

(60) Provisional application No. 62/936,990, filed on Nov. 18, 2019.

(51) Int. Cl.
*H04L 29/06* (2006.01)
*H04L 9/40* (2022.01)

(52) U.S. Cl.
CPC ...... *H04L 63/1491* (2013.01); *H04L 63/0218* (2013.01)

(58) Field of Classification Search
CPC .................. H04L 63/1491; H04L 63/0218
See application file for complete search history.

(56) References Cited

U.S. PATENT DOCUMENTS

| 8,117,640 B1 | 2/2012 | Moriconi et al. |
| 9,258,321 B2 | 2/2016 | Amsler et al. |
| 10,356,050 B1* | 7/2019 | Kumar ............... H04L 67/02 |
| 11,057,428 B1* | 7/2021 | Sellers ............... G06F 16/27 |
| 2002/0194506 A1 | 12/2002 | Wiley |
| 2003/0069973 A1 | 4/2003 | Ganesan |
| 2004/0103310 A1 | 5/2004 | Sobel |
| 2006/0155853 A1 | 7/2006 | Nesz |
| 2011/0116377 A1 | 5/2011 | Batz |
| 2013/0205361 A1 | 8/2013 | Narayanaswamy |
| 2014/0096229 A1 | 4/2014 | Burns et al. |

(Continued)

FOREIGN PATENT DOCUMENTS

| EP | 2782311 A1 | 9/2014 |
| EP | 2903238 A3 | 12/2015 |
| WO | 2015134008 A1 | 9/2015 |

OTHER PUBLICATIONS

European Search Report for corresponding EP Application No. 20199343.3, dated Mar. 3, 2021, pp. 1-10.

(Continued)

*Primary Examiner* — Wasika Nipa
(74) *Attorney, Agent, or Firm* — Troutman Pepper Hamilton Sanders LLP

(57) ABSTRACT

Technology related to a network application firewall is disclosed. In one example, a method includes intercepting a response from a network application and destined for a client. The response can be associated with a user identifier. A modified response can be forwarded to the client. The modified response can include a honeytrap embedded within the intercepted response. Engagement with the honeytrap can be detected in a subsequent request to the network application. In response to detecting the engagement with the honeytrap, an indication that the user identifier is malicious can be stored.

20 Claims, 8 Drawing Sheets

(56) References Cited

U.S. PATENT DOCUMENTS

| | | | |
|---|---|---|---|
| 2014/0298469 A1* | 10/2014 | Marion | H04L 63/1416 726/23 |
| 2015/0040192 A1 | 2/2015 | Kobold | |
| 2015/0043430 A1 | 2/2015 | Garcia Martin | |
| 2015/0047032 A1* | 2/2015 | Hannis | H04L 63/1491 726/23 |
| 2015/0326599 A1* | 11/2015 | Vissamsetty | H04L 63/1433 726/11 |
| 2016/0044025 A1* | 2/2016 | Goyal | G06F 21/36 726/6 |
| 2016/0094423 A1 | 3/2016 | Parthasarathy | |
| 2017/0222979 A1 | 8/2017 | Kuperman et al. | |
| 2017/0302628 A1 | 10/2017 | Vazquez Carames | |
| 2017/0310704 A1* | 10/2017 | Wu | H04L 63/1433 |
| 2018/0167412 A1* | 6/2018 | Barrett | H04L 63/1408 |
| 2018/0183833 A1 | 6/2018 | Skene | |
| 2019/0253389 A1 | 8/2019 | Verma | |
| 2021/0097569 A1* | 4/2021 | Devane | H04L 63/1425 |

OTHER PUBLICATIONS

"BIG-IP Network Firewall: Policies and Implementations," Version 11.3, Publication No. MAN-0439-00, F5 Networks, Inc., pp. 3-6, 8, 33-34, 40-41, 44, 52-55, and 57, Nov. 15, 2012.

"BIG-IP Network Firewall: Policies and Implementations," Version 11.4, Publication No. MAN-0439-01, F5 Networks, Inc., pp. 3-6, 17, 61-67, and 69-70, May 15, 2013.

"BIG-IP Policy Enforcement Manager: Implementations," Version 11.4, Publication No. MAN-0404-02, F5 Networks, Inc., pp. 1-96, May 15, 2013.

"BIG-IP Access Policy Manager®: Implementations," Version 13.0, Publication No. MAN-0508-04, F5 Networks, Inc., Jul. 11, 2017.

* cited by examiner

NETWORK APPLICATION FIREWALL

CROSS REFERENCE TO RELATED APPLICATION

This application claims the benefit of U.S. Provisional Patent Application Ser. No. 62/936,990 filed Nov. 18, 2019, which is hereby incorporated by reference in its entirety.

FIELD

This technology generally relates to network traffic management, and more specifically to network security systems.

BACKGROUND

A software application can be distributed or partitioned across different computing devices. For example, a client-server architecture can partition tasks between a client device (such as a laptop or mobile device) and one or more application server computers connected by an interconnection network (such as the Internet) and managed by a provider of computing service(s) and/or computing resource(s). The application server computer(s) can execute software applications to provide virtual resources, software services, and/or content to the client devices. For example, client devices can initiate communication sessions with the application server computers by sending requests over the interconnection network to the application server computers, and the servers can respond to the requests. An application that is accessible to a client over a network can be referred to as a network application. As the number of client devices seeking access to the application server computers increases, intermediary computing devices, such as network traffic management computing device(s), can be added between the client devices and the application server computers. Network traffic management computing device(s) can perform security, processing, and/or routing functions of the client-server architecture. For example, the network traffic management computing device can potentially increase the scalability, availability, security, and/or performance of the client-server architecture. However, as the complexity of applications increases and the number of interconnected devices increases, there can be many challenges in implementing a high performance, highly available, and secure client-server architecture including an intermediary computing device.

BRIEF SUMMARY

Generally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example includes a method implemented in cooperation with a network traffic management system including one or more network traffic management modules, networking modules, or server modules, the method including: intercepting a response from a network application and destined for a client, where the response is sent in response to a request associated with a user identifier. The method also includes forwarding a modified response to the client. The modified response includes a honeytrap embedded within the intercepted response. The method also includes detecting engagement with the honeytrap in a subsequent request to the network application. The method also includes, in response to detecting the engagement with the honeytrap, storing an indication that the user identifier is malicious.

Other embodiments incorporating this example include corresponding computer systems, apparatus, and computer programs recorded on one or more non-transitory computer readable media (e.g., computer storage devices), each configured to perform the actions of the methods. An example computer system includes one or more network traffic management modules, networking modules, or server modules, memory comprising programmed instructions stored thereon, and one or more processors configured to be capable of executing the stored programmed instructions to perform the actions of the methods. An example non-transitory computer readable medium having stored thereon instructions for executing a network application firewall, the instructions comprising executable code that, when executed by one or more processors, causes the processors to perform the actions of the methods. An example network traffic management apparatus includes memory comprising programmed instructions stored thereon and one or more processors configured to be capable of executing the stored programmed instructions to perform the actions of the methods.

DETAILED DESCRIPTION

Introduction

Figure 1:
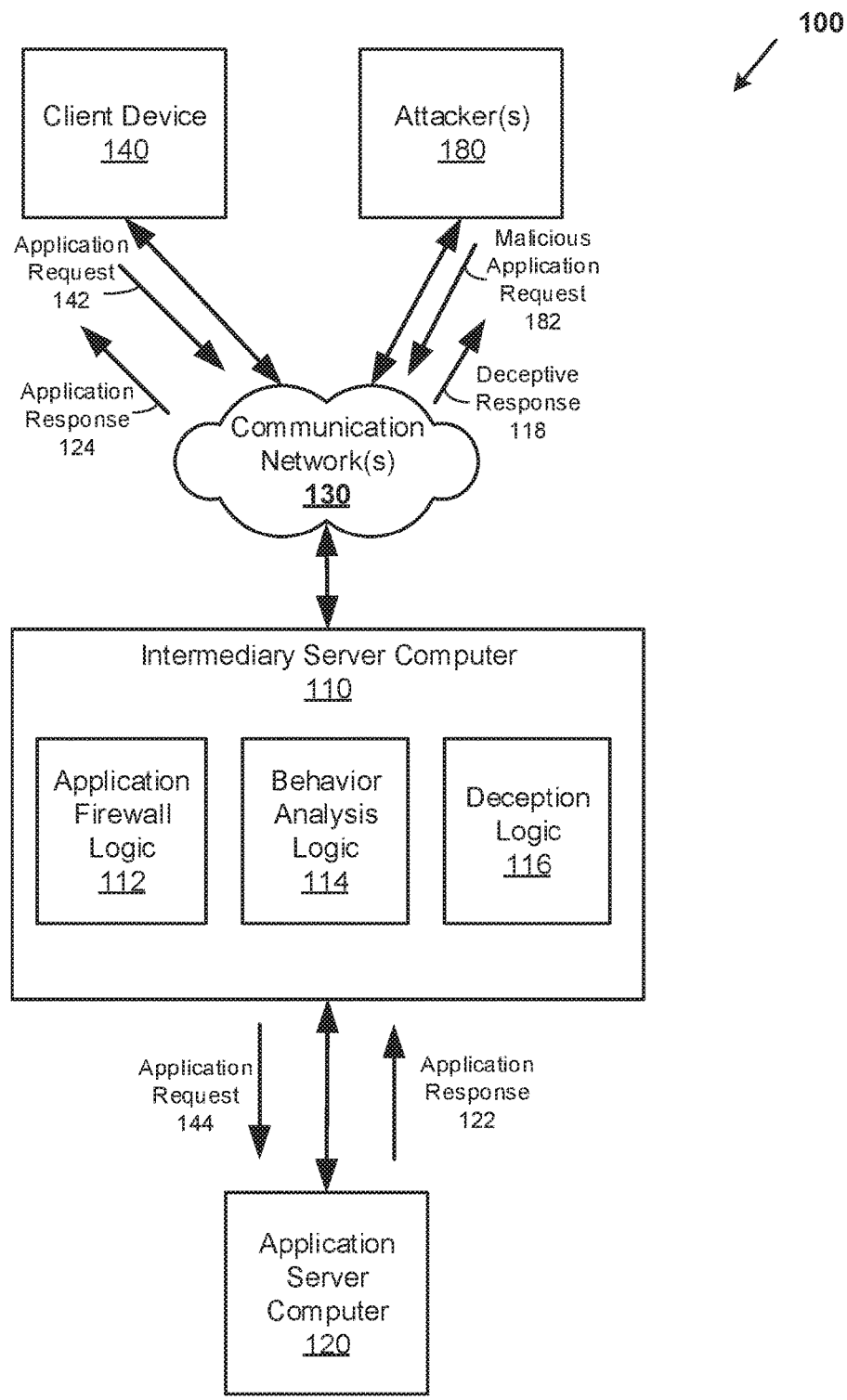
FIG. 1 is a block diagram of an example client-server architecture including an intermediary server computer including a network application firewall.

An intermediary server computer can perform various proxy and other services by processing packets that transit the intermediary server computer. For example, the intermediary server computer can perform security, load balancing, rate monitoring, caching, encryption/decryption, session management (including key generation), address translation, denial-of-service (DoS) protection, and/or access control functions, for example. An intermediary server computer can act as a proxy for an application server. A proxy is an agent that is situated in a path of communication between a client and a server (e.g., an application server) that can intercept communications (e.g., network packets, frames, datagrams, and messages) between the client and the server. The intermediary server computer can include a firewall. Additionally, functions performed by the application server computer can be offloaded from the application server computer to the intermediary server computer.

A firewall is a network security system that can monitor and/or control network traffic according to a network policy (e.g., a security policy). The network policy can include various rules for analyzing and controlling network traffic targeted at different layers of a network stack (also referred to as a protocol stack). The layers within a network packet can be described using the Open Systems Interconnection (OSI) model which partitions a communication system into seven layers. The OSI model is one example of how functions of a communication system can be partitioned into abstraction layers, but other models can be used. Lower level layers (e.g., layers 1-3) within the network stack can be used to manage voltage signaling and basic transport of the network traffic while higher level layers (e.g., layer 7) can be used to convey application data. An application firewall (also referred to as a network application firewall) is a firewall that includes rules for analyzing and controlling network traffic using fields from the higher communication layers (e.g., layer 7). For example, an application firewall can include rules for parsing, monitoring, controlling, and/or modifying network traffic of an application, such as Hypertext Transfer Protocol (HTTP). The rules can be based on operations and resources that are available within the application. A web application firewall is an application firewall that is capable of analyzing web traffic and can apply a security policy for traffic of a web application. For example, the security policy can implement rules for protecting specific features and/or pages of the web application. A web application is a client-server network application that includes a server that communicates with a client running in a web browser. A network application is an application that includes distributed agents (e.g., a client and a server) that communicate using an interconnection network.

Malicious users (also referred to as attackers) may try to impact the performance, integrity, and/or availability of an application. For example, an attacker may seek unauthorized access to application resources and/or user data. As another example, in a denial of service attack, the attacker may try to monopolize application resources and/or cause the application to crash. The attacker may use known or unknown vulnerabilities of the application (e.g., at the application layer) and/or of the networking infrastructure (e.g., at a lower layer of the network stack) The attacker can probe a network application with various requests to learn more about potential vulnerabilities and the attack can attempt to exploit the discovered vulnerabilities. Specifically, an attacker may deploy a targeted attack by actively discovering possible vulnerabilities and deployed protections of a network application using a wide range of reconnaissance techniques. Based on the information discovered about the targeted network application during the attacker's reconnaissance of the application, the attacker can customize and improve his or her methods to circumvent security measures of the network application and exploit the network application vulnerabilities.

The firewall and/or the application can be hardened by including safeguards to increase a security of the application, such as by blocking, delaying, and/or identifying malicious users. However, these safeguards can also impact the usability of the application for legitimate, non-malicious users. For example, captcha and other challenge-response tests can be used to potentially distinguish between human users and automated bots. Automated bots may be used in various types of attacks. However, some legitimate users may find these challenges cumbersome and/or annoying and they may stop using an application with captchas which can cause a provider of the application to lose revenue (such as from lost sales). Additionally, the additional safeguards can potentially cause false positives where a legitimate user is labeled as a malicious user and denied access. Some application providers may opt to reduce friction on legitimate users by having fewer and/or simpler safeguards which may provide insufficient protection against sophisticated attackers. The fewer and/or simpler safeguards can make the application an easier attack target which can cause financial losses through fraud and reduced performance, integrity, and/or availability of the application.

As described herein, safeguards that are more transparent to legitimate users can be used to increase a security of the application. For example, attacks targeted to a network application can potentially be reduced or eliminated by proactively luring and detecting attackers based on a knowledge of the attacker's reconnaissance methods, evasion techniques, and/or exploitation tactics. Additionally, the attackers can be deceived and diverted to expend resources and malicious activity on fake virtual targets. One type of fake virtual target is a honeypot. Generally, a honeypot is a resource that appears to include valuable resources (e.g., data and/or computing resources) of a network application. A honeypot can be used to attract an attacker so the attacker expends its resources interacting (e.g., attempting to infiltrate or disable a system or attempting to modify, delete, or copy data) with the honeypot instead of the main resources of the network application. Some honeypot solutions can be focused on simulating non-existing network services.

Another type of fake virtual target is a honeytrap. A honeytrap is information that is purposefully added to a response that an attacker may use in an attempted attack on a network application. For example, a honeytrap can include a deceptive payload inserted (such as by a proxy or firewall) into traffic of a protected network application. The honeytrap can make the network application appear to be vulnerable to a cyber-attack. Specifically, the honeytrap can be formatted to include information that appears to be exploitable in an attack of the network application. The honeytrap can include a variable, a resource, or a credential that appears useful to the attacker when used and/or modified during an attack of the network application. For example, the honeytrap can be based on a knowledge of an attacker's reconnaissance methods, evasion techniques, and exploitation tactics. Honeytraps can emulate non-existent uniform resource identifiers (URIs) or uniform resource locators (URLs), vulnerable authentication dialogs, insecure session management mechanisms, information leakage, and other network application security issues. Machine learning algorithms can be used to generate honeytokens that look like other entities of the protected network application.

An application firewall can insert and track honeytraps based on a variety of criteria. For example, the application firewall can insert honeytraps in responses to requests that appear to be suspicious or that are from users that have been labelled as suspicious. The application firewall can monitor requests to detect whether a honeytrap has been engaged. Engagement with a honeytrap can be detected when a request uses and/or includes a tampered element of the honeytrap, such as by following a fake generated URI, tampering with a fake cookie, or changing a fake parameter value, where the fake elements were included in a honeytrap that was sent earlier. Engagement with the honeytrap can indicate a high probability that the request is from an attacker. Benign requests (no honeypot engagement) can be forwarded to the network application. However, potentially malicious requests (requests that engage with the honeypot) can be forwarded to a deception engine.

The deception engine can simulate a vulnerable computer system, can insert additional honeytraps to potentially learn more about the attacker, and can generate reports on malicious activity. The reports can include high precision information about attackers and forms of attack, which can be used to enhance the protection of the network application. The deception engine can be isolated from and use different data and computing resources than the primary computing resources of the network application. By using different resources, the deception engine can conserve the primary computing resources of the network application and make them more efficient. Additionally, the data of the network application can be more secure since the attack is less likely to gain access to it.

The deception engine can use deception and gamification to potentially increase an attacker's engagement and keep the attacker away from the primary resources of the network application. The deception engine can respond to an attackers requests using additional honeytraps. For example, the additional honeytraps can be selected to potentially ascertain methods and/or motives of the attacker. The methods and/or motives of the attacker can be reported to a log or to an administrator. When the additional honeytraps are engaged, a confidence that a suspicious request and/or user is malicious can be increased. Increasing a suspicion level of a user beyond a threshold is referred to herein as convicting the user. The threshold can be set at a level where the user is highly likely to be an attacker when the suspicion level achieves or crosses the threshold. The deception engine can enter a proactive deception stage in response to convicting the user. In the proactive deception stage, the deception engine can respond to all requests associated with the attacker's session. The responses to the requests can simulate vulnerable systems, such as web servers, databases, file systems, and so forth. The application firewall and deception engine can simulate the systems that are present in the protected network application without allowing access to the targeted resources. During the deception stage, the application firewall and deception engine can use a set of heuristics to simulate various multistep attack scenarios. Fake information that is perceived by an attacker to be more precious and sensitive can be generated as a reward for moving to more advanced stages of the process. By using active deception, the system can potentially defend against zero-day and advanced attacks in real time while providing accurate alerts. For example, attackers can potentially be detected and redirected by simulating application vulnerabilities and by sending deceitful responses to the attacker.

The disclosed technology can be used to protect applications using a variety of protocols such as HTTP, Network News Transfer Protocol (NNTP), and other messaging protocols. Protocols such as HTTP and NNTP can provide developers with a flexible and feature-rich environment with which to build an application. While these features can provide an increased user experience, the features can also be more prone to novel attacks because of the flexibility of the protocols and the high number of corner cases that can be introduced by that flexibility. For example, an attacker can attempt to trick a user behind the application client or manipulate the application server in a variety of ways. Using honeytraps and deceitful responses for these types of applications can potentially enable early detection and isolation of a malicious user before he or she is able to exploit potential vulnerabilities of the application.

Example Architectures for a Network Application Firewall

FIG. 1 is a block diagram of an example client-server architecture 100 including an intermediary server computer 110 including a network application firewall, such as a web application firewall. Specifically, FIG. 1 illustrates how network traffic between a client device 140 and an application server computer 120 can be forwarded by the intermediary server computer 110 and how network traffic of the application can be processed by the intermediary server computer 110. The client-server architecture 100 can include the intermediary server computer 110, the application server 120, communication network(s) 130, and the client device 140. The client-server architecture 100 can be implemented using a client-server architecture as described in more detail with reference to FIG. 7, where the different components (110, 120, 130, 140) of the client-server architecture can be implemented using a computing environment as described in more detail with reference to FIG. 8. Additionally, an attacker 180 can attempt to attack the client-server architecture 100.

The client device 140 and the application server 120 can communicate via the communication network(s) 130 and the intermediary server computer 110. Specifically, requests from the client device 140 can be intercepted by and forwarded through the intermediary server computer 110 to the application server 120 using the communication network(s) 130. The communication network(s) 130 can include private and/or public networks (such as the Internet). Responses from the application server 120 can be intercepted by and forwarded through the intermediary server computer 110 to the client device 140. Prior to forwarding a request or a response, the intermediary server computer 110 can insert data and/or modify network traffic as it transits the intermediary server computer 110.

The client device 140 can be a computing device capable of sending network traffic over a communications network (e.g., network 130). For example, the client device 140 can be a mobile computing device, a desktop computing device, a laptop computing device, a tablet computing device, a virtual machine executing on a cloud-based computing environment, and so forth. The client device 140 can execute an agent (e.g., a browser or other software application) that requests a service provided by the application server 120. The application server 120 can be computing device capable of sending network traffic over a communications network (e.g., network 130) and processing requests by client devices (such as the client device 140). The server computer 120 can include multiple hardware and/or software server resources (not shown), a virtual machine executing on a cloud-based computing environment, and so forth. The application server 120 can execute a server software application (e.g., a network application), such as an HTTP server application, for example. The attacker 180 can be a client device that is used by a malicious user that seeks to disable or use the application server computer 120 resources and/or data in an unauthorized manner.

The intermediary server computer 110 includes a network application firewall. For example, the network application can be a web application, and the network application firewall can be a web application firewall. The network application firewall can be used to protect resources and/or data of the application server 120, such as by mitigating an attack that is initiated by the attacker 180. The network application firewall can include network application firewall logic 112, behavioral analysis logic 114, and deception logic 116. The logic of the network application firewall can be computer hardware, software, and/or combinations thereof. As illustrated, the logic is partitioned into the three components (112, 114, 116), but the logic can be partitioned in other ways. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations. As one example, the network application firewall can include a software daemon executed by a processor of the intermediary server computer 110. A daemon is a software routine that runs as a background process. A real-time software routine is a routine that processes information with a time constraint. Real-time systems can schedule tasks (e.g., threads) based on time constraints and can preempt or interrupt tasks based on a priority of completing the task.

The application firewall logic 112 can manage the network traffic that transits the intermediary server computer 110, such as the network traffic between the client device 140 and the application server 120. Specifically, the application firewall logic 112 can intercept requests from the client device 140 and the attacker 180. The requests can be analyzed by parsing fields within the network packets of the requests and by examining the values in those fields to determine if the requests are suspicious. As one example, the requests can be analyzed by the behavioral analysis logic 114. The behavioral analysis logic 114 can determine whether the request is suspicious. For example, the behavioral analysis logic 114 can determine whether the request matches an attack signature, such as by including characteristics that can be used to exploit vulnerable network applications. A source (e.g., a user identifier and/or a client identifier) of each request can be identified. The behavioral analysis logic 114 can store and analyze a history of network traffic between users and the network application. For example, the behavioral analysis logic 114 can determine whether a honeytrap has been sent to a user and whether a request includes data showing that the user has engaged with the honeytrap. Each user can be assigned a reputation score based on the types of network traffic sent to the network application. For example, a user that sends a number of suspicious requests to the network application may be labeled as suspicious or malicious. A user that has not sent any suspicious requests to the network application can be labeled as legitimate or benign. Changing the classification of a user from benign or suspicious to malicious can be referred to as convicting the user. Benign and suspicious users may have requests forwarded to the network application by the application firewall logic 112.

Malicious users may have requests handled by the deception logic 116. Specifically, the deception logic 116 can format and send a response to the malicious user that is consistent with the request without allowing the request to go to the network application. For example, the request from a malicious user may include engagement with a honeytrap, such as when the malicious user is attacking the application server. As an example attack, a request can include a request to login with false credentials that were provided in the honeytrap. The deception logic 116 can return a response that appears as if the login were successful. As another example, the request can include a fake URI and the response can be formatted to appear as if data is returned from the network application using the fake URI. The data can be fake, randomized, and/or include additional honeytraps. By engaging with the malicious user, resources of the malicious user can be tied up by the deception logic 116 potentially slowing and/or preventing the malicious user from probing the application server for vulnerabilities.

The application firewall logic 112 can intercept responses from the application server 120 that are destined for the client device 140 and the attacker 180. The responses can be sent modified or unmodified from the application firewall logic 112. For example, the application firewall logic 112 can match a response to a client or user identifier. The application firewall logic 112 can determine whether to add a honeytrap to the response based on a status of the client or user identifier. As a specific example, honeytraps can be added to responses that are destined to suspicious or malicious user identifiers. The application firewall logic 112 can track the honeytraps added to the responses so that any future engagement with the honeytraps can be detected.

Figure 2:
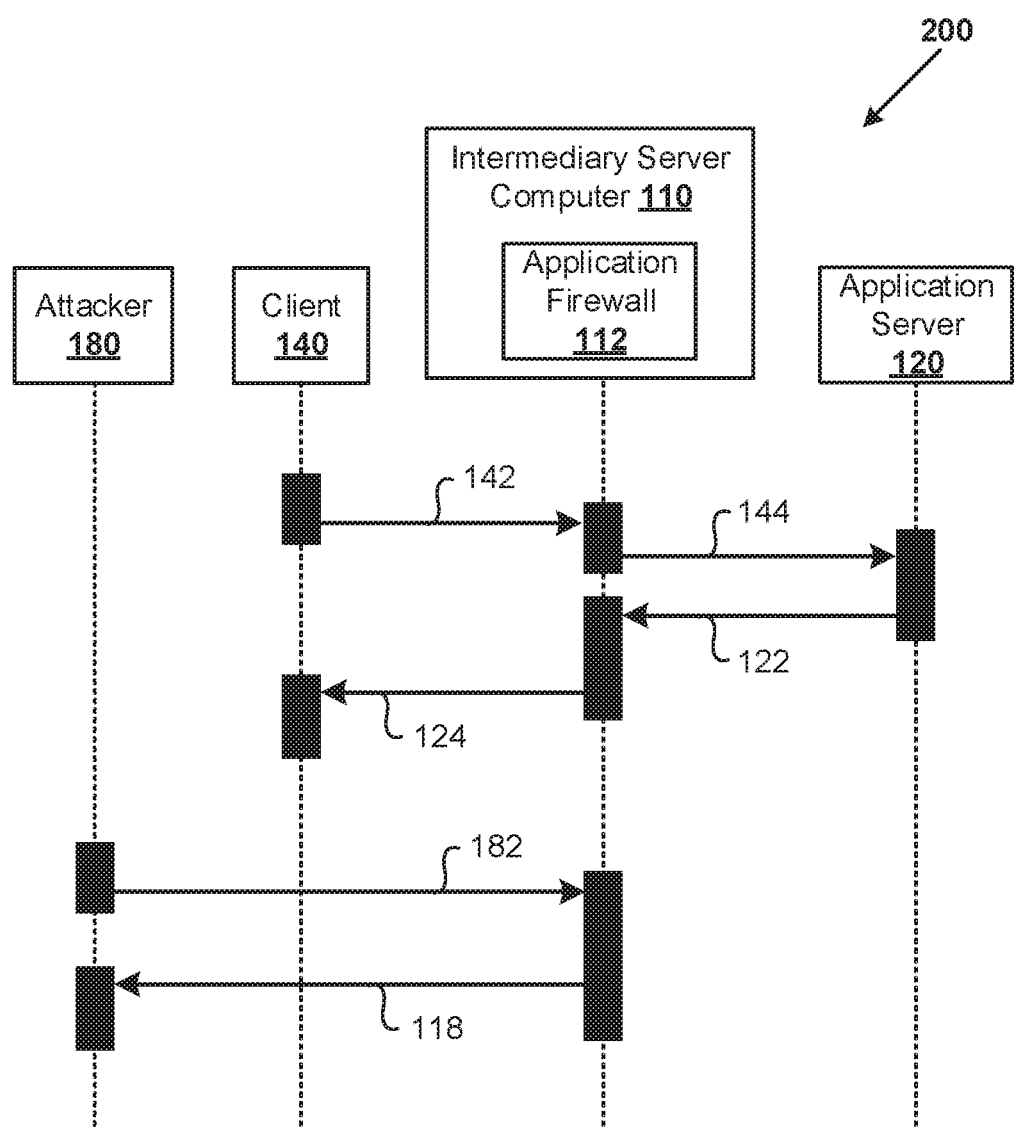
FIG. 2 is a sequence diagram of example transactions using an application firewall and an application server.

FIG. 1 and a sequence diagram 200 of FIG. 2 illustrate example transactions using the application firewall of the intermediary server computer 110 and the application server computer 120. The client device 140 can be operated by a benign user. The benign user can send an application request 142 from the client device 140 to the intermediary server computer 110 via the communication network 130. The intermediary server computer 110 can identify that the request 142 came from the benign user and is not suspicious or malicious. The application request can be forwarded (modified or unmodified) from the intermediary server computer 110 to the application server computer 120 as the application request 144. The application server computer 120, executing the network application, can process the request 144 and generate an application response 122. The application response 122 can be intercepted and processed by the intermediary server computer 110. The intermediary server computer 110 can forward the response (modified or unmodified) back to the client device 140 as application response 124 via the communication network 130. As one example, the response 124 can include a honeytrap that has been embedded within or added to the response 122.

As another example, an attacker 180 can send a malicious application request 182 to the intermediary server computer 110 via the communication network 130. The intermediary server computer 110 can intercept and process the malicious application request 182. Specifically, the intermediary server computer 110 can detect that the malicious request 182 is malicious either because the request 182 is from a user identifier that was previously identified as a malicious user or the request 182 engages a honeytrap that was sent to a previously identified malicious or suspicious user. A deceptive response 118 to the malicious request 182 can be generated by the deception logic 116 rather than forwarding the malicious request 182 onto the application server computer 120. The deceptive response 118 can appear to be from the application server computer 120 and can appear to include data or other response that is consistent with an attack that was attempted using the malicious request 182. The deceptive response 118 can be sent back to the attacker 180 via the communication network 130.

Figure 3:
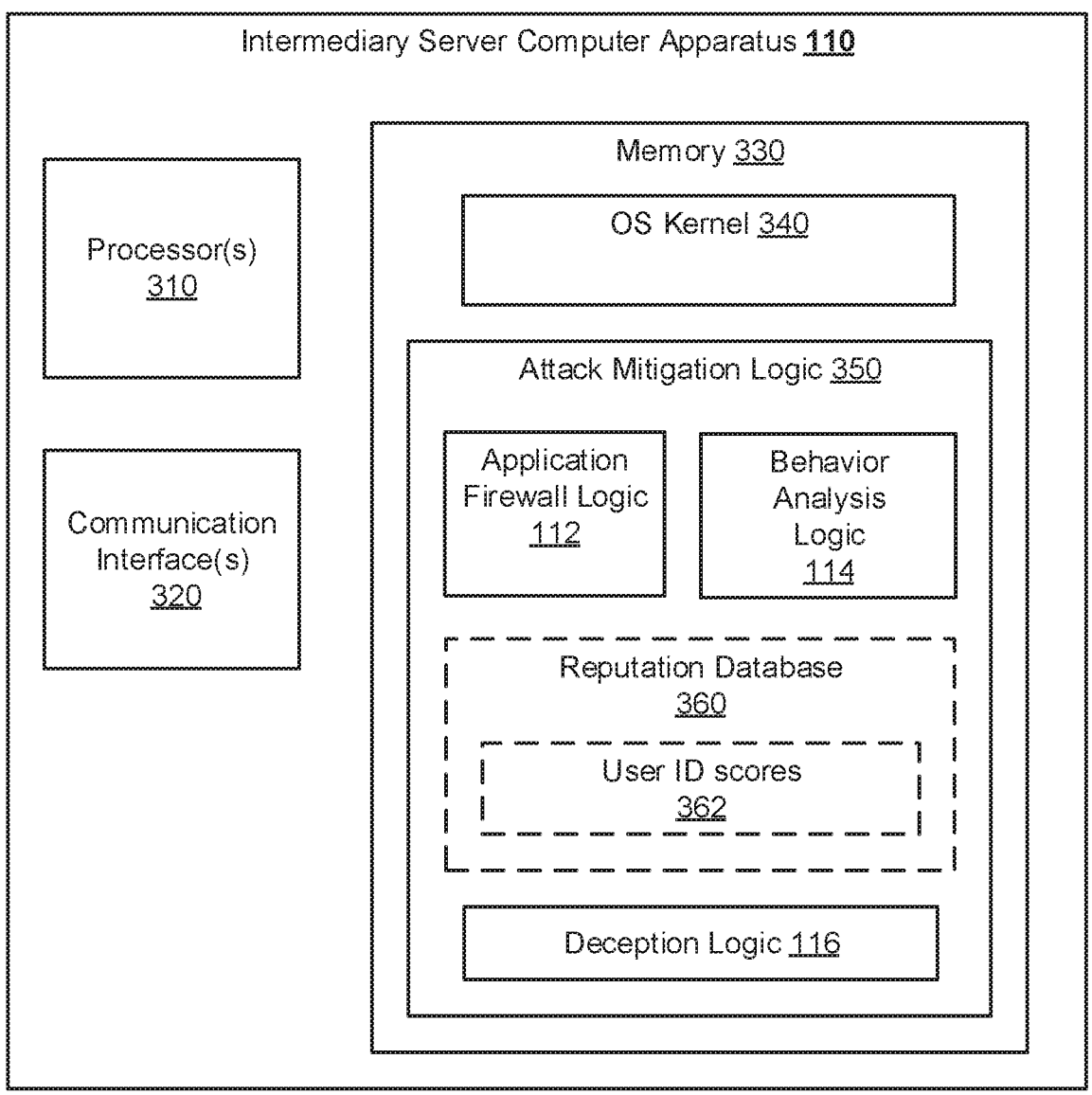
FIG. 3 is a block diagram of an example intermediary server computer apparatus including attack mitigation logic, such as for a network application firewall.

FIG. 3 is a block diagram of an example intermediary server computer apparatus 110 including attack mitigation logic 350, such as for a network application firewall. For example, the intermediary server computer apparatus 110 can be a load balancer, an application delivery controller, a network traffic management system, or another component configured to be in a communication path between a client (e.g., client 140 of FIG. 1) and an application server (e.g., application server 120 of FIG. 1) of a client-server architecture. The intermediary server computer apparatus 110 can be implemented using a computing environment as described in more detail with reference to FIG. 8.

The intermediary server computer apparatus 110 can include one or more processor(s) 310, one or more communication interface(s) 320, and memory 330. The processor 310, communication interface 320, and the memory 330 can be coupled together with an interconnect (not shown) so that the components of the computer apparatus 110 can communicate with each other using the interconnect. The communication interface 320 can be used to send and receive communications (e.g., network packets) with other computing devices, such as a client and an application server. The processor 310 can be used to execute computer-executable instructions that are stored in the memory 330 and/or storage resources (not shown). The computer-executable instructions can be organized into software routines (also referred to as modules or components) comprising executable code to perform various computing tasks. It should be noted that while FIG. 3 illustrates one organization of routines, other organizations are possible. For example, the illustrated routines can be sub-divided into smaller routines and/or combined into larger routines. The memory 330 can also include structured and/or unstructured data (e.g., user identifier scores 362 or other data structures) that is used by the software routines to perform the computing tasks.

The memory 330 can include different software routines for controlling the network traffic transiting the intermediary server computer 110 by performing various proxy and other services, such as load balancing, rate monitoring, caching, encryption/decryption, TLS session management (including key generation), address translation, traffic forwarding, traffic buffering, and/or access control, for example. For example, the memory 330 can buffer network traffic that is to be processed before the traffic is sent over a private or public network to a client or server. As another example, the memory 330 can buffer outstanding requests that are awaiting a reply from an application server.

The operating system (OS) kernel 340 can include different software routines for managing different aspects of the execution of programs and for interfacing with the hardware of the intermediary server computer apparatus 110. For example, the OS kernel 340 can manage the loading and removal of software applications and other routines into the memory 330 of the computer apparatus 110; the OS kernel 340 can manage storage resources of the computer apparatus 110; the OS kernel 340 can manage processes and/or threads executing on the processor 310; the OS kernel 340 can manage power states of the computer apparatus 110; the OS kernel 340 can provide an interface for applications and other routines to send and receive communications (e.g., network packets) using the communications interface 320; and the OS kernel 340 can enable inter-process communication between different routines executing on the computer apparatus 110.

Generally, the attack mitigation logic 350 can perform operations to implement a network application firewall. The attack mitigation logic 350 can be organized in various different ways. As one example, the attack mitigation logic 350 can include application firewall logic 112, behavioral analysis logic 114, deception logic 116, and a reputation database 360. The different components of the attack mitigation logic 350 can be implemented in computer hardware, software, or combinations thereof.

The application firewall logic 112 can receive requests from clients of the application server. The requests can be analyzed to identify a user identifier of each request and to determine how the request should be handled. For example, the application firewall logic 112 can determine whether to forward a request to the application server or to the deception logic 116. The application firewall logic 112 can make the determination based on characteristics of the request and/or the user identifier associated with the request. For example, each user making a request to the application server can be assigned a score that is representative of a likelihood that the user is an attacker of the network application.

The user identifier scores 362 can be determined in conjunction with the behavioral analysis logic 114 and the user identifier scores 362 can be maintained in the reputation database 360. The user identifier score 362 for a given user can be updated when a new request from the given user is received by the application firewall logic 112. For example, a user score can be adjusted (e.g., raised) to indicate that the user is more likely to be a malicious user when the user sends a suspicious request, and the user score can be adjusted (e.g., lowered) to indicate that the user is less likely to be a malicious user when the user sends a benign request. An exemplary method for generating and maintaining scores, which are also referred to as flow scores, is described and illustrated in more detail in U.S. Pat. No. 10,432,652, issued Oct. 1, 2019, which is hereby incorporated by reference in its entirety. The range of user scores can be partitioned into different categories so that scores falling under a first threshold can indicate the user identifier is benign, scores falling between the first threshold and a second threshold can indicate the user identifier is suspicious, and scores above the second threshold can indicate the user identifier is malicious, for example.

The application firewall logic 112 can determine whether a request and/or user identifier is benign, suspicious, or malicious. A benign request is a request that complies with a security policy of the firewall, does not match an attack signature, and does not engage with a honeytrap. A suspicious or malicious request is a request that does not comply with at least one rule of a security policy of the firewall, matches an attack signature, and/or engages with a honeytrap. For example, the attack signatures can include publicly and/or privately known vulnerabilities to cyberattacks, such as the publicly known cybersecurity vulnerabilities of the Common Vulnerabilities and Exposures (CVE) list that is maintained by the MITRE CORPORATION. The requests can be tracked so that responses returning from the network application or the deception logic 116 can be matched to the original requests. As one example, honeytraps can be added to responses that correspond to suspicious or malicious requests.

As described above, a honeytrap is information that is purposefully added to a response that an attacker may use in an attempted attack on a network application. Generally, a honeytrap can include a deceptive payload inserted into a response from a protected network application. The honeytrap can include a variable, a resource, or a credential that appears useful to the attacker when used and/or modified during an attack of the network application. A honeytrap is engaged when a subsequent request is sent or addressed to the network application and the subsequent request uses an element of the honeytrap and/or includes a tampered element of the honeytrap. As a specific example, a honeytrap can include a cookie (e.g., an HTTP cookie) injected into a response, such as a cookie that appears to modify a privilege of the user (e.g., "Set-Cookie: isAdmin=false"). Engagement with the honeytrap can include modifying the value of the cookie in a subsequent request, such as by attempting to raise a privilege level of the user (e.g., modifying the cookie to "Set-Cookie: isAdmin=true"). As another example, a honeytrap can include a form input parameter with a value injected into a response, such as a parameter that appears to enable unauthorized access, information, or features (e.g., input type="hidden" name="debug" value="false">). Engagement with the honeytrap can include modifying the value of the parameter in a subsequent request, such as by attempting to gain unauthorized access, obtain unauthorized information, or use an unauthorized feature (e.g., modifying the parameter value to: input type="hidden" name="debug" value="true">). As another example, a honeytrap can include a value injected into a header of a response (e.g., X-ABCCorp-Access-Control: isAdmin=false) and engagement with the honeytrap can include modifying the value in the header in a subsequent request (e.g., X-ABCCorp-Access-Control: isAdmin=true). As another example, a honeytrap can include false credentials injected in the response, such as false credentials injected in comments of a response (e.g., "<!—Test Credentials: test:adm—>"). Engagement with the honeytrap can include using the false credentials in a subsequent request, such as in an attempt to gain access to the network application using the false credentials. As another example, a honeytrap can include a false URI injected in the response, such as a false URI injected in comments of a response. Engagement with the honeytrap can include using the false URI in a subsequent request. As another example, a honeytrap can include a false entry (e.g., false credentials or a false URI) injected in a known file sent with the response, such as a false entry injected within a robots.txt file. As another example, a honeytrap can include a false token (e.g., a cross-site request forgery (CSRF) token or a JSON web token (JWT) token) injected into a response. Engagement with the honeytrap can include using the false token in a subsequent request. As one example, engaging with the honeytrap can be classified as malicious.

When the request and/or the user is determined to be malicious, the application firewall logic 112 can forward the request to the deception logic 116 so that the deception logic 116 can generate a deceptive response to the request. When the request and/or the user is determined to be benign, the application firewall logic 112 can forward the request to the application server. When the request and/or the user is suspicious, the request can be sent to either the deception logic 116 or the application server based on administrator settings and/or characteristics of the request, for example.

The network application server can process requests and return a response to the client via the intermediary server computer apparatus 110. Specifically, the application firewall logic 112 can intercept responses from the application server that are destined for a client. The application firewall logic 112 can match the intercepted response to a request that was used to generate a response. For example, a user identifier or a request identifier can be common to both the request and the response and enable the request in response to be matched. The application firewall logic 112 can determine whether to add a honeytrap to the response. As one example, the application firewall logic 112 can add a honeytrap to every response from the network application. As another example, the application firewall logic 112 can add a honeytrap to responses that are matched to suspicious or malicious requests and/or user identifiers.

The deception logic 116 can be used to process malicious requests and/or suspicious requests from malicious users. For example, the deception logic 116 can be used to process requests that have engaged a honeytrap. The deception logic 116 can attempt to engage an attacker by providing information to the attacker that is consistent with an attack making progress and/or succeeding. For example, the deception logic 116 can analyze a request and determine if an attack signature is detected. If an attack signature is not recognized or if there is not a corresponding response to send for the attack signature, an error response can be sent. For example, the request can be an HTTP request and the response can be a HTTP response that returns an error code in the range of 400 to 599 (e.g., error 404 not found, error 426 upgrade required, or error 599 network connect timeout error). The error pages can be customized for the network application and/or the error pages can be a default page of the deception logic 116.

If an attack signature is recognized, the response generated by the deception logic 116 can be consistent with the type of attack of the attack signature. For example, when the attack includes a request for logging in using fake credentials from a honeytrap, the response can indicate a successful login even though the attacker has not gained access to the network application. By responding in this manner, the attacker can potentially send more requests to the deception logic 116 so that the motives and methods of the attacker can be further ascertained. As another example, when the attack includes a request including server-side code injection, the response can include a fake stack trace to make it appear as though the network application was crashed. As another example, when the attack is a SQL injection attack, the response can include a SQL error code that makes the attack appear like it was making progress. As another example, if the attack includes a request for a file, such as a password file, the response can include a file including false information and/or more honeytraps. For example, the file can include fake URIs and/or fake credentials. Additional deceitful responses can be sent for attacks that correspond to specific features of the network application. As the methods and motives of attackers are publicized and/or learned by the deception logic 116, the attack signatures can be updated and the deceitful responses sent in response to a request of an attack can also be updated.

Example Methods of a Network Application Firewall

Figure 4:
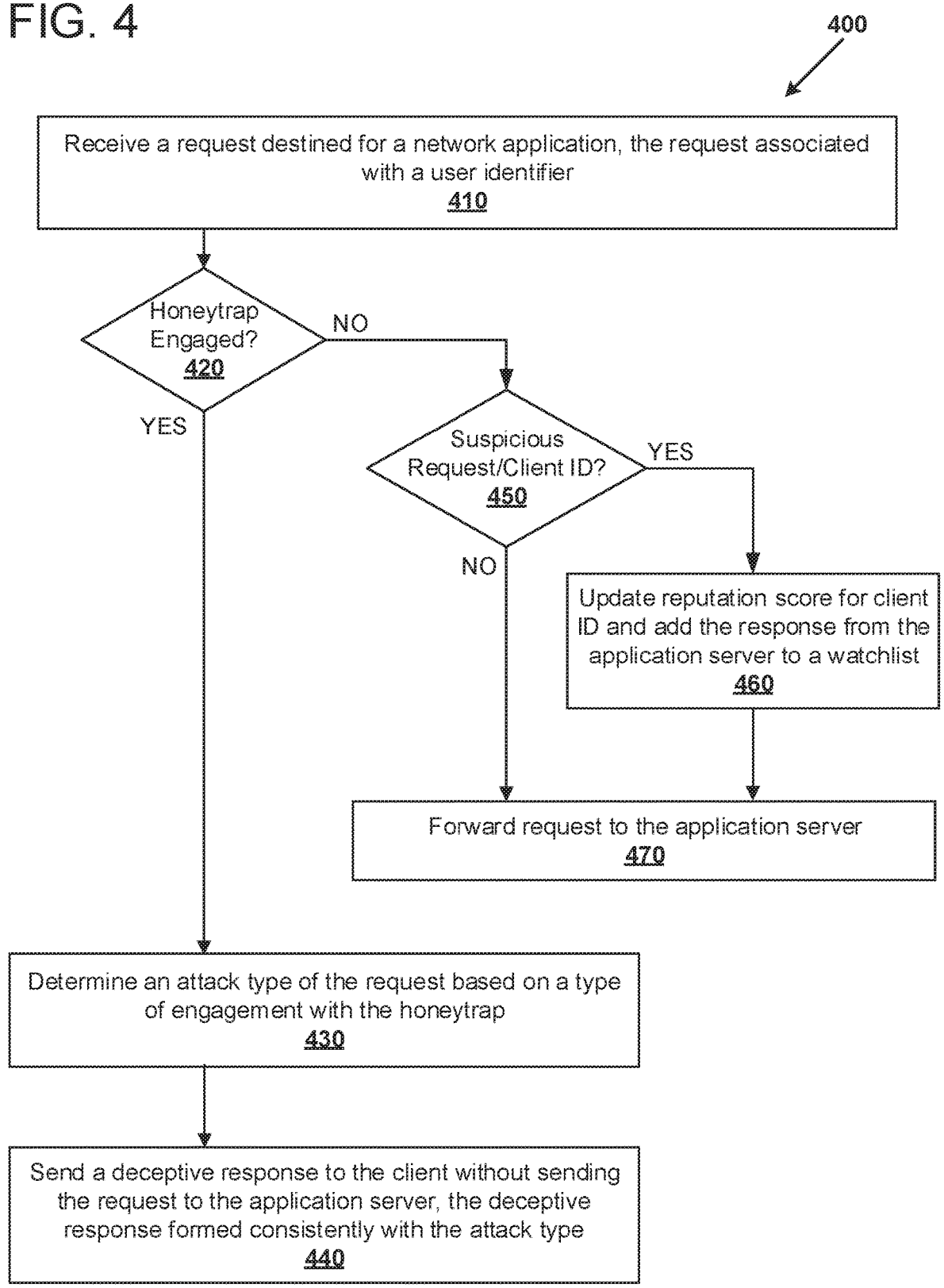
FIG. 4 is a flowchart of an example method for processing requests for a network application.

FIG. 4 is a flowchart of an example method 400 for processing requests for a network application. Specifically, the method 400 illustrates how a network application firewall (such as a firewall executing on an intermediary server computer) can intercept and process requests that are destined for network application. The network application can be a web application. The method 400 can be implemented using the architecture 100, such as described above in reference to FIGS. 1-3. As one example, computer-executable instructions for carrying out the method 400 can be stored in computer-readable memory (e.g., the memory 330) and the instructions can be executed by one or more processor(s) (e.g., the processor 310) to perform the method 400.

At 410, a request destined for a network application can be received. For example, the request can be intercepted by a network application firewall executing on an intermediary server computer that is interposed between a client and the network application. The request can be analyzed to determine various characteristics about the request. For example, a client identifier or user identifier can be determined. The client or user identifier may be associated with one or more honeytraps that were embedded with earlier responses to the client or user identifier. A user or client database or data structure can include information such as whether a honeytrap has been sent to the user or client, which honeytraps were sent and any values of the honeytraps, a reputation score of the user or client, and so forth. As another example, the request can be analyzed to determine whether a request matches an attack signature or whether the request is suspicious in some way.

At 420, it can be determined whether a honeytrap was engaged. For example, the honeytrap can include a parameter name and value that appears vulnerable to an attacker, such as a parameter that indicates the user is not an administrator. Engagement with the honeytrap can be detected when the parameter and/or the value is used or modified, such as when the request includes a parameter with a value that has been changed from indicating the request is not from an administrator to being a value that indicates the request is from an administrator. If no engagement with the honeytrap is not detected, the method 400 can continue at 450. However, if engagement with the honeytrap is detected, the method 400 can continue at 430.

At 430, and attack type of the request can be determined based on the type of engagement with the honeytrap. For example, a privilege escalation attack can be detected when a request modifies a honeytrap value to indicate a higher privilege level than was sent in the response with the original honeytrap. As another example, a reconnaissance attack can be detected when a request is requesting to follow a fake URI that was provided in an earlier honeytrap. As another example, an attempt that unauthorized access can be detected when a request uses fake credentials that were provided in a honeytrap.

At 440, a deceptive response can be sent to the client, without sending the request to the application server. Specifically, rather than sending a request from an attack to the network application, a response to the request can be generated at a firewall that executes on different resources than the application server. In this manner, the resources of the application server can be used for legitimate requests instead of being used to process requests of an attacker. The deceptive response can be formed consistently with the attack type that was determined at 430. For example, a response to a privilege escalation attack can be formatted to make it appear as though the attacker gained higher privilege access to the resources of the network application. As another example, a response to fake credentials can make it appear as though the attacker was successful at logging into the network application. As another example, a response to a reconnaissance attack following a fake URI can return a fake page that appears as though it came from the network application.

At 450, it can be determined whether the received request, or client identifier associated with the request, is suspicious. For example, the request may be part of an atypical flow through the network application, such as by requesting webpages out of order, requesting webpages or quickly than a human would be likely to request, initiating with the network application on pages other than common landing pages, and so forth. As another example, the client or user identifier can have a reputation score that indicates a client or user is suspicious. If the request and/or client identifier is not suspicious, then the method 400 can continue at 470. If the request and/or the client identifier is suspicious, then the method 400 can continue at 460.

At 460, the reputation score for the client identifier can be updated. For example, the reputation score can be updated to indicate the client appears more suspicious when the request associated with the client appears to be suspicious. As another example, the reputation score can be updated to indicate the client appears less suspicious when the request associated with the client is benign or not suspicious. Additionally, an entry on a watch list can be added to indicate that a response from the application server and back to the client identifier should be modified. For example, the a honeytrap can be added to the responses to suspicious requests and/or clients.

At 470, the received request can be forwarded to the application server. The application server can process the request and generate a response that is destined for the client that made the request.

Figure 5:
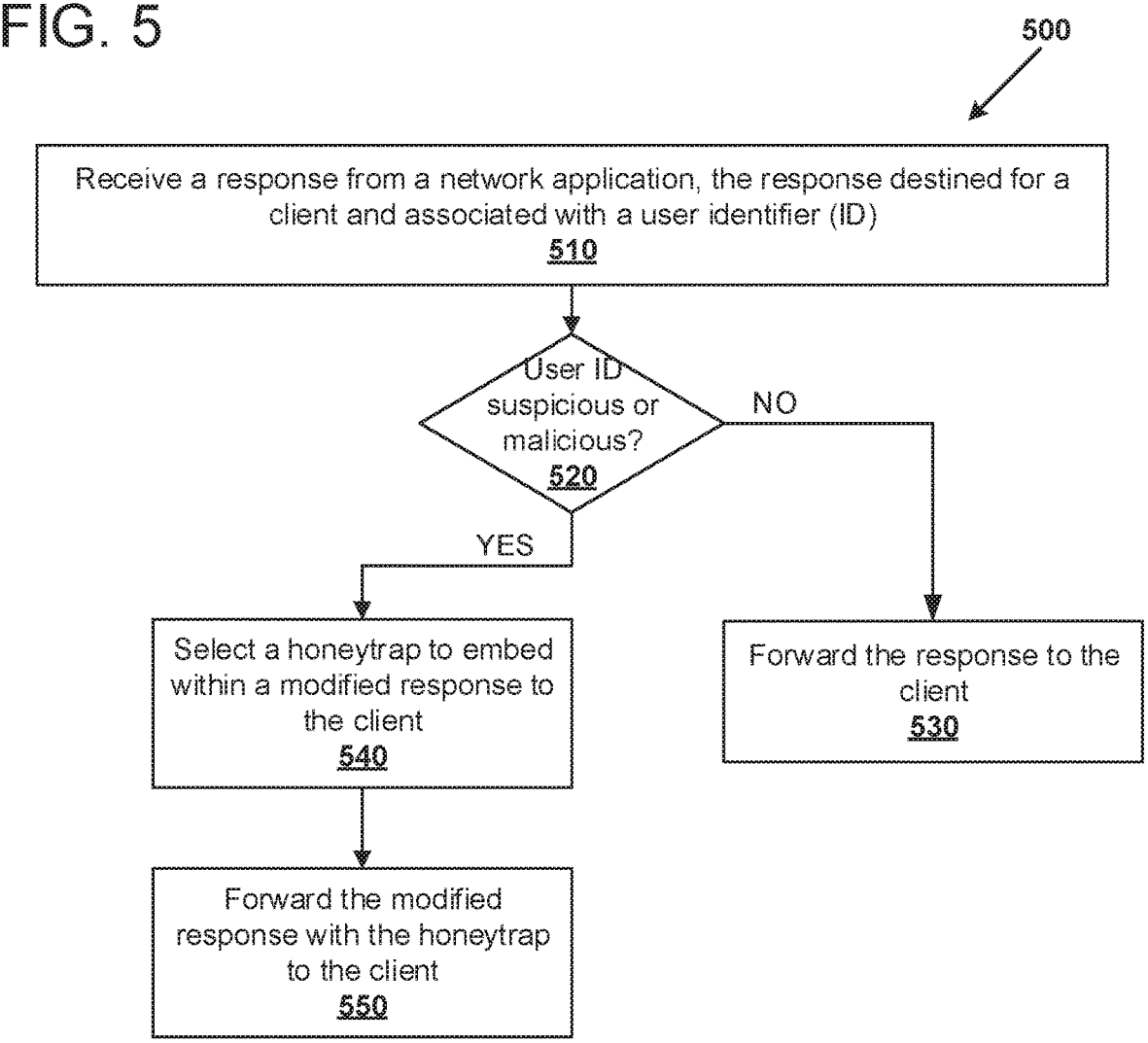
FIG. 5 is a flowchart of an example method for processing responses from a network application.

FIG. 5 is a flowchart of an example method for processing responses from a network application. Specifically, the method 500 illustrates how a network application firewall (such as a firewall executing on an intermediary server computer) can intercept and process responses that are sent from a network application and are destined for network application. The network application can be a web application so that the network application firewall functions as a web application firewall. The method 500 can be implemented using the architecture 100, such as described above in reference to FIGS. 1-4. As one example, computer-executable instructions for carrying out the method 500 can be stored in computer-readable memory (e.g., the memory 330) and the instructions can be executed by one or more processor(s) (e.g., the processor 310) to perform the method 500.

At 510, a response from a network application can be received. The response can be destined for a client and associated with a user identifier. For example, the response can be sent in response to the network application receiving a request from the client and/or the user. Packet fields of the response can be used to match the response to the originating request. For example, the packet fields can include a user identifier field, a request identifier field, and so forth. Information about the request can be stored in a watchlist database or data structure, and the watchlist database or data structure can be used to match the response with the originating request.

At 520, it can be determined whether the response was sent in response to a suspicious or malicious user identifier and/or a suspicious request. For example, the watchlist data structure can indicate whether the request was suspicious or malicious and/or whether the client identifier was suspicious or malicious. If the user identifier for the request is suspicious or malicious, the method 500 can continue at 540. If the user identifier and the request are not suspicious or malicious, the method 500 can continue at 530

At 530, the response can be forwarded to the client. The response can be modified or unmodified before it is forwarded to the client. For example, the packet can be modified by a proxy to mask private network addresses of the resources of the network application. In other words, and address of the response can be translated to be a publicly announced network address. In some implementations, a honeytrap can be added to the response. In other implementations, the honeytrap can be omitted. By omitting the honeytrap, network bandwidth between the client and the firewall may be more efficiently utilized when there is no evidence to suspect the client or of the request as being malicious.

At 540, a honeytrap can be selected to embed within the received response before it is sent to the client. The honeytrap can be selected based on the type of attack that is suspected of being carried out by the client. Heuristics can be used to track a sequence of probable operations by an attacker, and the honeytraps can be selected to feed the attacker false information to keep the attacker away from primary resources of the network application.

At 550, the modified response with the embedded honeytrap can be forwarded to the client. Additionally, a client or user database can be updated to indicate which honeytrap and the associated values of the honeytrap that have been sent to the client or user. By tracking the honeytraps and the values of the honeytraps, the source of a request using a particular honeytrap can be matched to the original requestor.

Figure 6:
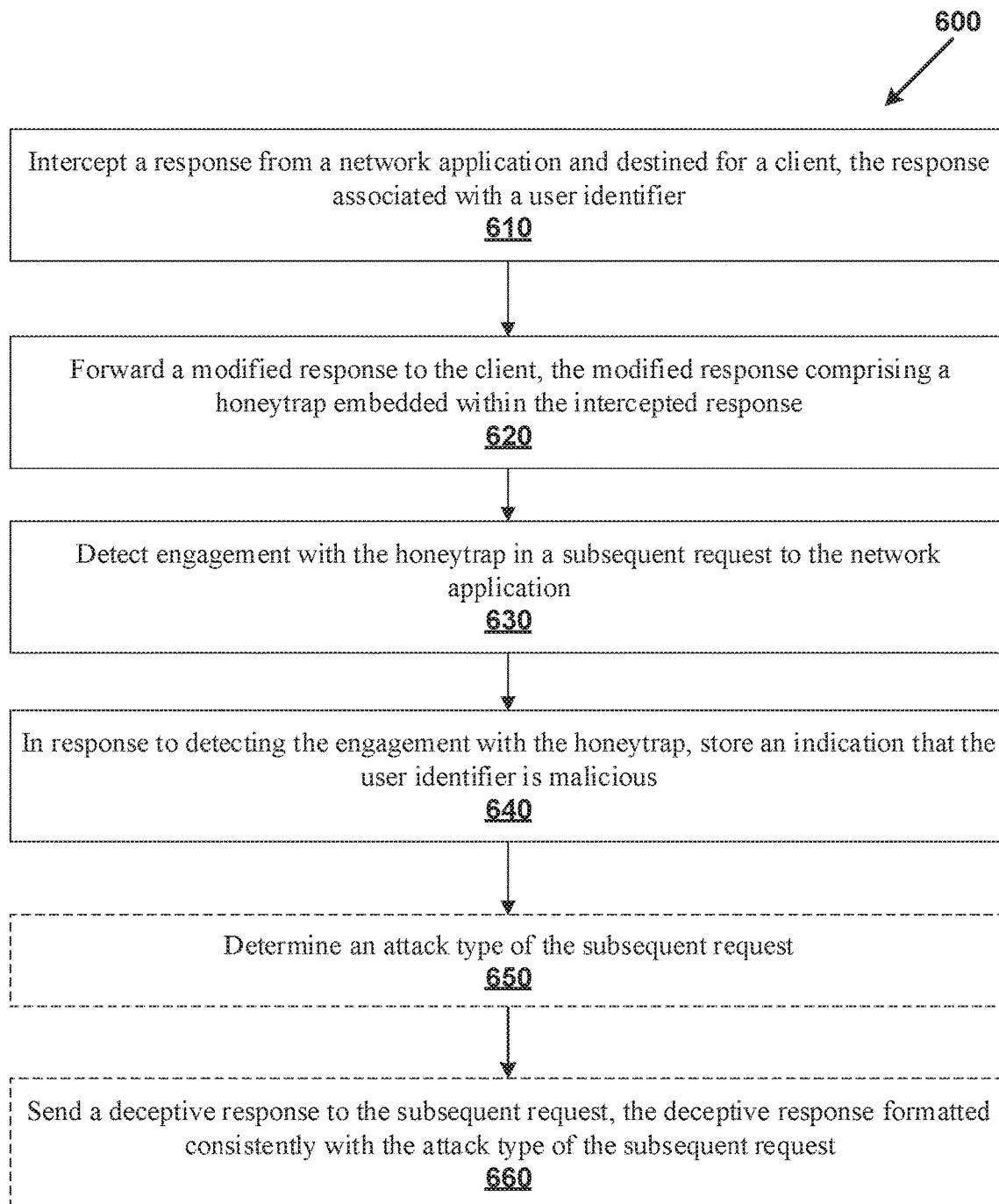
FIG. 6 is a flowchart of an example method of a network application firewall.

FIG. 6 is a flowchart of an example method 600 of a network application firewall. Specifically, the method 600 illustrates how a network application firewall (such as a firewall executing on an intermediary server computer) can process network traffic that is being sent between a network application and a client. The method 600 can be implemented using the architecture 100, such as described above in reference to FIGS. 1-5. As one example, computer-executable instructions for carrying out the method 600 can be stored in computer-readable memory (e.g., the memory 330) and the instructions can be executed by one or more processor(s) (e.g., the processor 310) to perform the method 600.

At 610, a response from a network application and destined for a client can be intercepted. The response can be sent in response to an earlier request to the network application and associated with a user identifier. The response can be analyzed to determine a client identifier or user identifier of the response. The response can be matched to the earlier request. For example, requests with pending responses can be added to a watchlist, and the watchlist can be consulted when responses from the network application are intercepted. The requests on the watchlist can be labeled as suspicious, malicious, or benign, for example.

At 620, a modified response can be forwarded to the client. The modified response can include a honeytrap embedded within the intercepted response. As one example, honeytraps can be added to responses that were generated in response to a suspicious request or a suspicious client or user. As another example, honeytraps can be added to all responses that are intercepted from the network application. As another example, the response can be modified in response to detecting the user identifier associated with the request is suspicious based on a behavioral analysis of a plurality of requests from the user identifier. The honeytrap can be selected from a set of honeytraps. For example, the set of honeytraps can include different honeytraps for different types of attacks. As specific examples, the set of honeytraps can include a false uniform resource identifier (URI) or a false credential. The set of honeytraps can be dynamically updateable, such as by an administrator of the firewall. For example, the set of honeytraps can be included in network or security policy of the firewall.

At 630, engagement with the honeytrap can be detected in a subsequent request to the network application. Engagement with the honeytrap can be detected when the subsequent request uses and/or includes a tampered element of a honeytrap that was sent with an earlier response. For example, engagement with the honeytrap can include following a false URI or attempting to login with a false credential, when the false URI or credential were included in a honeytrap sent with an earlier response.

At 640, in response to detecting the engagement with the honeytrap, an indication that the user identifier is malicious can be stored. For example, reputation scores can be maintained for the users that have been identified as attempting to access the network application. When a user identifier is detected engaging with a honeytrap, the reputation score for the user can increased above a threshold of a malicious user. As another example, the user identifier can be flagged as malicious when the user is detected engaging with a honeytrap.

At optional 650, an attack type of the subsequent request can be determined. Attack types can include tampering with administrator credentials, server-side code injection, SQL attacks, reconnaissance of URIs or files, unauthorized access attempts using false credentials, and so forth.

At optional 660, a deceptive response to the subsequent request can be sent. For example, the deceptive response can be sent by deception logic (e.g., deception logic 116) that is isolated from the primary resources of the network application. The deceptive response can be formatted consistently with the attack type of the subsequent request.

Example Computing Environments

Figure 7:
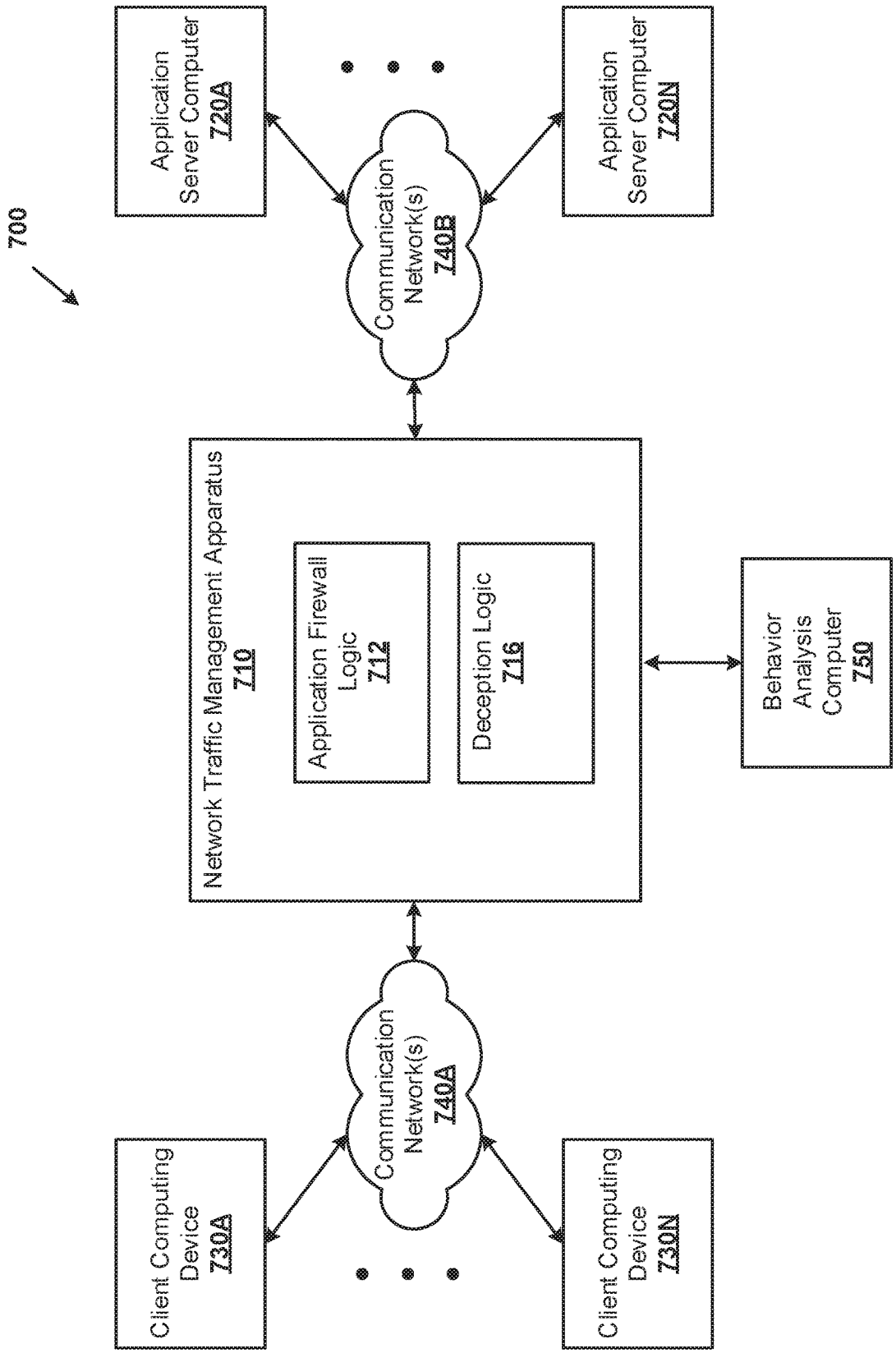
FIG. 7 is a block diagram of an example client-server architecture including application firewall logic.

FIG. 7 illustrates an example client-server architecture 700 (also referred to as a network traffic management system) that incorporates a network traffic management apparatus 710. The client-server architecture 700 includes a network traffic management apparatus 710 that is coupled to one or more server computers (such as application server computers 720A-N) and one or more client devices (such as client computing devices 730A-N) via one or more communication networks (such as the communication networks 740A and 740B). The server computers 720A-N can communicate with one or more additional server computer(s) that are accessible via the communication networks 740A. As one example, the communication network 740A can include a public network (e.g., the Internet) and devices attached to the network 740A can be accessed using public network addresses; the communication network 740B can include a private network and devices attached to the network 740B can be accessed using private network addresses.

The communication networks 740A-B can include various wired and/or wireless communication technologies, such as a local area network (LAN), a wide area network (WAN), an intranet, the Internet, a public switched telephone network (PSTN), and so forth. The devices connected to the communication networks 740A-B can communicate with each other using various communications protocols, such as transmission control protocol with Internet protocol (TCP/IP) over Ethernet and/or other customized or industry-standard protocols. The communication protocols can be used to transmit information over the networks 740A-B using packet-based messages (e.g., Ethernet-based packet data networks) and/or other application programming interfaces (APIs). An API is a programmatic interface (e.g., a set of methods and/or protocols) for communicating among different modules. The communication networks 740A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 710 is positioned in-line between the client computing devices 730A-N and the server computers 720A-N so that the network traffic management apparatus 710 can intercept all network traffic flowing between the different networks 740A and 740B. In other examples, the network traffic management apparatus 710, the server computers 720A-N, and the client devices 730A-N can be coupled together via other topologies. As one specific example, the server computers 720A-N can be integrated within the network traffic management system 700 (e.g., server computer functions can be implemented in software within one or more devices of the network traffic management apparatus 710). It should be appreciated by one of ordinary skill in the art having the benefit of the present disclosure, that the network topology illustrated in FIG. 7 has been simplified and that multiple networks and networking devices can be utilized to interconnect the various computing systems disclosed herein. Additionally, one or more of the devices of the client-server architecture 700 in these examples can be in a same or a different communication network including one or more public, private, or cloud networks, for example.

Figure 8:
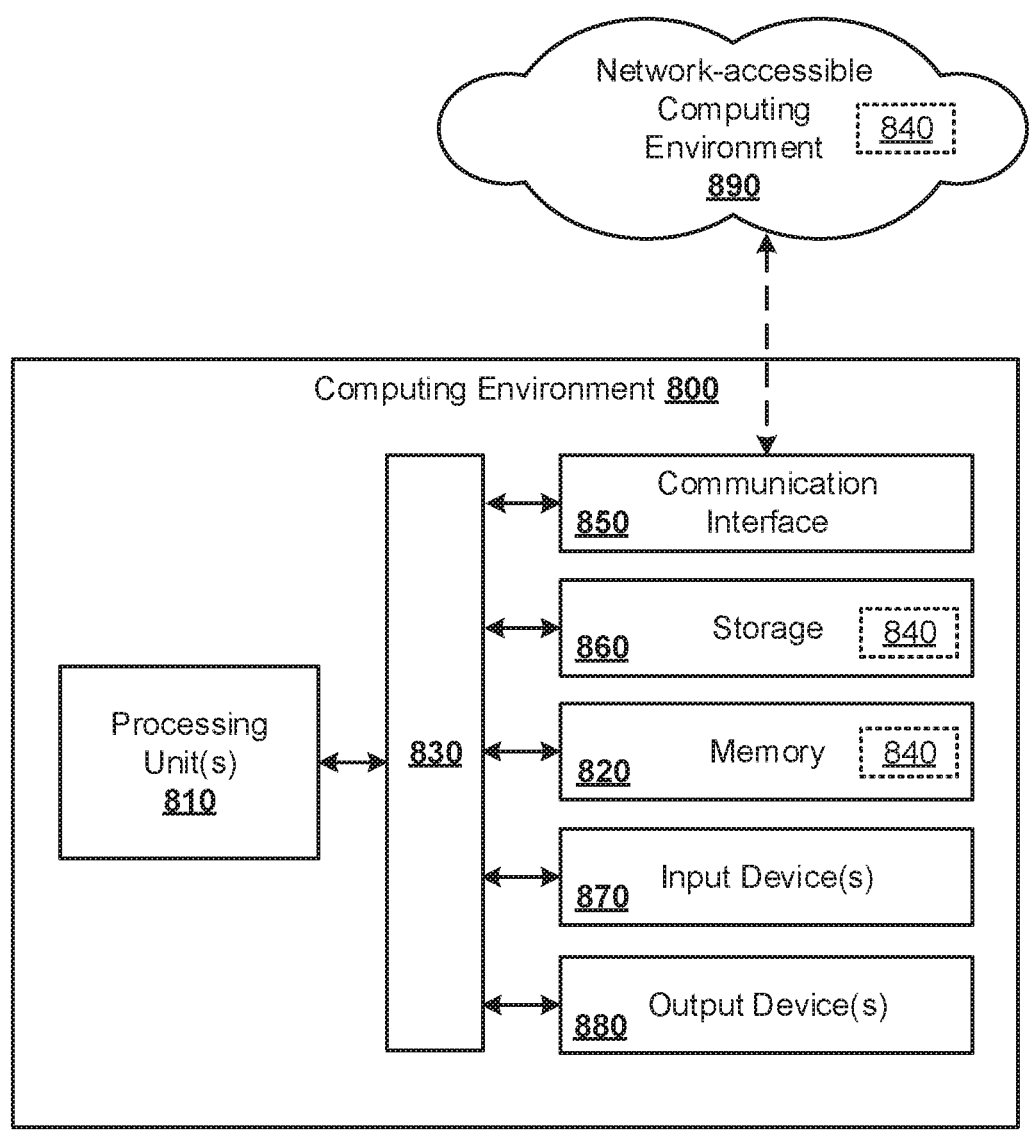
FIG. 8 is a block diagram of an example computing environment, such as can be used for a server computer.

Generally, the server computers 720A-N, the client devices 730A-N, and the network traffic management system 700 can perform various computing tasks that are implemented using a computing environment, such as the computing environment described in more detail with respect to FIG. 8. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 730A-N can include any type of computing device that can exchange network data, such as mobile communication devices, laptop computers, desktop computers, tablet computers, virtual machines executing within a cloud-computer-based environment, and so forth. The client devices 730A-N can run interface applications, such as web browsers or standalone client applications, which may provide an interface to communicate with (e.g., make requests for, and receive content stored on) one or more of the server computers 720A-N via the communication network(s) 740A and 740B. The client devices 730A-N can further include an output device (such as a display screen or touchscreen (not illustrated)) and/or an input device (such as a keyboard (not illustrated)). Additionally, one or more of the client devices 730A-N can be configured to execute software code (e.g., JavaScript code within a web browser) in order to log client-side data and provide the logged data to the network traffic management apparatus 710 or the server computers 720A-N.

The server computers 720A-N can include any type of computing device that can exchange network data. For example, the server computers 720A-N can exchange network data with the client devices 730A-N and with each other. As another example, the server computers 720A-N can exchange communications along communication paths specified by application logic in order to facilitate a client-server application interacting with the client devices 730A-N. Examples of the server computers 720A-N can include application servers, database servers, access control servers, web servers, and encryption servers. Accordingly, in some examples, one or more of the server computers 720A-N process login and other requests received from the client devices 730A-N via the communication network(s) 740A and 740B according to the Hypertext Transfer Protocol (HTTP) or Hypertext Transfer Protocol Secure (HTTPS) application-layer protocol. A web application may be operating on one or more of the server computers 720A-N and transmitting data (e.g., files or web pages) to the client devices 730A-N (e.g., via the network traffic management apparatus 710) in response to requests from the client devices 730A-N. The server computers 720A-N can be hardware and/or software and may represent a system with multiple servers in a pool, which may include internal or external networks.

While the server computers 720A-N are illustrated as single devices, one or more actions of each of the server computers 720A-N may be distributed across one or more distinct network computing devices that together comprise one or more of the server computers 720A-N. Moreover, the server computers 720A-N are not limited to a particular configuration. Thus, the server computers 720A-N may contain network computing devices that operate using a coordinated approach, whereby one of the network computing devices of the server computers 720A-N operate to manage or otherwise coordinate operations of the other network computing devices. Each of the server computers 720A-N can operate as a networked computing device within a cluster architecture, a computing device within a peer-to peer architecture, a virtual machine, or a resource within a cloud-based computer architecture, for example. Thus, the technology disclosed herein is not to be construed as being limited to a single environment and other configurations and architectures are also envisaged. For example, one or more of the server computers 720A-N can operate within the network traffic management apparatus 710 itself rather than as a stand-alone server device communicating with the network traffic management apparatus 710 via communication network 740B. In this example, the one or more of the server computers 720A-N operate within the memory of the network traffic management apparatus 710.

The network traffic management apparatus 710 can include any type of computing device that can be used for managing network traffic. The network traffic management apparatus 710 can perform a number of functions, including providing network security, access control, load balancing network traffic across the server computers 720A-N, and/or accelerating network traffic associated with an application hosted by one or more of the server computers 720A-N, for example. Each of the functions can be performed by a service. The services can be incorporated into workloads that are executed by the network traffic management apparatus 710 For example, the network traffic management apparatus 710 can include a workload that is used to perform proxy and other services on behalf of the server 720A-N and to manage traffic between the clients 730A-N and the servers 720A-N. Additionally, the network traffic management apparatus 710 can include other network devices such as one or more routers or switches, for example.

The network traffic management apparatus 710 can include application firewall logic 712 and deception logic 716 as described above with reference to FIGS. 1-6. For example, the application firewall logic 712 can be used mitigate cyberattacks and implement a network or security policy for a network application, such as a web application. The application firewall logic 712 can intercept client requests that are destined for a network application executing on the application server computers 720A-N. The intercepted client requests can be analyzed, and based on the analysis, the application firewall logic 712 can determine whether the requests will be forwarded to the application server computers 720A-N or the deception logic 716. For example, suspicious or benign requests can be forwarded to the application server computers 720A-N so that the network application can generate a response to the requests. Malicious requests can be forwarded to the deception logic 716 and deceptive responses can be generated for the malicious requests. The deceptive responses can be formatted consistently with an attack type of the malicious requests. The deceptive responses can potentially redirect the attacker away from attacking resources of the network application. The application firewall logic 712 can intercept responses from the application server computers 720A-N and the deception logic 716. Honeytraps can be added to the intercepted responses before they are forwarded to the clients. The honeytraps can be used to detect later malicious requests, such as when the honeytraps have been engaged.

While the network traffic management apparatus 710 is illustrated in this example as including a single device, the network traffic management apparatus 710 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 710. Additionally, the network traffic management apparatus 710 and/or the application(s) executed by the network traffic management apparatus 710 can be operative in a cloud-based computing environment. The application(s) can be executed within or as virtual machine(s) or virtual server(s) that can be managed in a cloud-based computing environment. For example, the application(s), and even the network traffic management apparatus 710 itself, can be located in virtual server(s) running in a cloud-based computing environment rather than being tied to one or more specific physical network computing devices. Also, the application(s) can be running in one or more virtual machines (VMs) executing on the network traffic management apparatus 710. Additionally, in one or more examples of this technology, virtual machine(s) running on the network traffic management apparatus 710 can be managed or supervised by a hypervisor. Additionally, one or more of the components that together comprise the network traffic management apparatus 710 can be standalone devices or integrated with one or more other devices or apparatuses, such as with one or more of the server computers 720A-N, for example.

Additionally, one or more of the components depicted in the client-server architecture 700, such as the network traffic management apparatus 710, server computers 720A-N, or client computing devices 730A-N, for example, may be configured to operate as virtual instances on the same physical machine. In other words, one or more of the network traffic management apparatus 710, server computers 720A-N, or client computing devices 730A-N may operate on the same physical device rather than as separate devices communicating through communication networks 740A and 740B. Additionally, there may be more or fewer network traffic management apparatuses, client computing devices, or server computers than illustrated in FIG. 7.

FIG. 8 illustrates a block diagram of a generalized example of a suitable computing environment 800 that can be used to implement the examples, techniques, and technologies described herein. For example, the computing environment 800 can be used to implement a network traffic management apparatus including an intermediary server that performs the disclosed techniques for executing a network application firewall.

The computing environment 800 includes at least one processing unit 810 and computer-readable memory 820, which are coupled together by an interconnect 830. The processing unit 810 executes computer-executable instructions. The processing unit 810 can include a general-purpose processor, a special-purpose processor, and combinations thereof. For example, the processing unit 810 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 820 stores software 840 implementing one or more innovations described herein, in the form of computer-executable instructions suitable for execution by the processing unit 810. Specifically, the memory 820 can be used to store computer-executable instructions, data structures, input data, output data, and other information. The memory 820 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 820 can include operating system software (not illustrated). Operating system software can provide an operating environment for other software executing in the computing environment 800 and can coordinate activities of the components of the computing environment 800.

The interconnect 830 is used to connect different components of the computing environment 800 together so that the processing unit 810 can communicate with the different components and/or so that the different components can communicate with each other. For example, the interconnect 830 can include a bus, controller, and/or a network. As one example, the interconnect 830 can include a host bridge (also referred to as a northbridge) for connecting the processing unit 810 to relatively high-speed components (such as the memory 820) and an input/output bridge (also referred to as a southbridge) for connecting to relatively lower-speed components (such as a communications interface 850) within the computing environment 800. In some examples, one or more components of the computing environment 800 can be integrated within or connected directly to the processing unit 810.

The computing environment 800 can include a communication interface 850 for communicating with another computing entity using a communication medium (e.g., a physical layer). The communication interface 850 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 850 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 850 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 7, a communication interface of the network traffic management apparatus 710 operatively couples to and communicates with the communication networks 740A and 740B so that the network traffic management apparatus 710 is coupled to and can communicate with the server computers 720A-N and the client computing devices 730A-N.

The computing environment 800 can include storage 860 that is used to store instructions for the software 840, data structures, and data, which can be used to implement the technologies described herein. The storage 860 can include electronic circuitry for reading and/or writing to removable or non-removable storage media using magnetic, optical, or other reading and writing system that is coupled to the processor. The storage 860 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 800.

The computing environment 800 can include input device(s) 870. For example, the input device(s) 870 can provide an input interface to a user of the computing environment 800 and/or to receive inputs from a physical environment. The input device(s) 870 can include a tactile input device (e.g., a keyboard, a mouse, or a touchscreen), a microphone, a camera, a sensor, or another device that provides input to the computing environment 800.

The computing environment 800 can include output device(s) 880. For example, the output device(s) 880 can provide an output interface to a user of the computing environment 800 and/or to generate an output observable in a physical environment. The output device(s) 880 can include a light-emitting diode, a display, a printer, a speaker, a CD-writer, or another device that provides output from the computing environment 800. In some examples, the input device(s) 870 and the output device(s) 880 can be used together to provide a user interface to a user of the computing environment 800.

The computing environment 800 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 810 and the network-accessible computing environment 890 that is linked through a communications network. In a distributed computing environment, program modules 840 (including executable instructions for executing a network application firewall) can be located in both local and remote memory storage devices.

The term computer-readable media includes non-transient media for data storage, such as memory 820 and storage 860, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method implemented by a network traffic management system comprising one or more network traffic management apparatuses, server devices, or client devices, the method comprising:
    intercepting a response from a network application and destined for a client, the response sent in response to a request associated with a user identifier;
    determining that the user identifier associated with the request is a suspicious or malicious user identifier;
    based on the determining, forwarding a modified response to the client, the modified response comprising a honeytrap embedded within the intercepted response, wherein the honeytrap comprises a deceptive payload inserted into the intercepted response that appears useful to an attacker when at least part of the deceptive payload is modified during an attack of the network application;
    detecting engagement with the honeytrap in a subsequent request to the network application, wherein the detecting comprises detecting a modifying of at least part of the deceptive payload in the subsequent request; and
    in response to detecting the engagement with the honeytrap, storing an indication that the user identifier is malicious.

2. The method of claim 1, further comprising:
    determining an attack type of the subsequent request; and
    sending a deceptive response to the subsequent request, the deceptive response formatted consistently with the attack type of the subsequent request.

3. The method of claim 1, wherein the honeytrap is selected from a plurality of honeytraps, and the plurality of honeytraps are dynamically updateable.

4. The method of claim 1, wherein the honeytrap comprises a false uniform resource identifier (URI), and the engagement with the honeytrap in the subsequent request is a request to access the false URI.

5. The method of claim 1, wherein the honeytrap comprises a false credential, and the engagement with the honeytrap in the subsequent request further comprises a request to access a resource using the false credential.

6. The method of claim 1, wherein the response is modified in response to detecting the user identifier associated with the request is suspicious based on a behavioral analysis of a plurality of requests from the user identifier.

7. A system comprising one or more network application firewall modules, networking modules, or server modules, memory comprising programmed instructions stored thereon, and one or more processors configured to be capable of executing the stored programmed instructions to:
    intercept a response from a network application and destined for a client, the response sent in response to a request associated with a user identifier;
    determine that the user identifier associated with the request is a suspicious or malicious user identifier;
    based on the determination, forward a modified response to the client, the modified response comprising a honeytrap embedded within the intercepted response, wherein the honeytrap comprises a deceptive payload inserted into the intercepted response that appears useful to an attacker when the deceptive payload is modified during an attack of the network application;
    detect engagement with the honeytrap in a subsequent request to the network application, wherein the detecting comprises detecting a modified version of the deceptive payload in the subsequent request; and
    in response to detecting the engagement with the honeytrap, store an indication that the user identifier is malicious.

8. The system of claim 7, wherein the one or more processors are further configured to be capable of executing the stored programmed instructions to:
    determine an attack type of the subsequent request; and
    send a deceptive response to the subsequent request, the deceptive response formatted consistently with the attack type of the subsequent request.

9. The system of claim 7, wherein the honeytrap comprises a false uniform resource identifier (URI), and the engagement with the honeytrap in the subsequent request is a request to access the false URI.

10. The system of claim 7, wherein the honeytrap comprises a false credential, and the engagement with the honeytrap in the subsequent request further comprises a request to access a resource using the false credential.

11. The system of claim 7, wherein the response is modified in response to detecting the user identifier associated with the request is suspicious based on a behavioral analysis of a plurality of requests from the user identifier.

12. A non-transitory computer readable medium having stored thereon instructions comprising executable code that, when executed by one or more processors, causes the one or more processors to:
- intercept a response from a network application and destined for a client, the response sent in response to a request associated with a user identifier;
- determine that the user identifier associated with the request is a suspicious or malicious user identifier;
- based on the determination, forward a modified response to the client, the modified response comprising a honeytrap embedded within the intercepted response, wherein the honeytrap comprises a deceptive payload inserted into the intercepted response that appears useful to an attacker when the deceptive payload is modified during an attack of the network application;
- detect engagement with the honeytrap in a subsequent request to the network application, wherein the detecting comprises detecting a modified version of the deceptive payload in the subsequent request; and
- in response to detecting the engagement with the honeytrap, store an indication that the user identifier is malicious.

13. The computer readable medium of claim 12, wherein the instructions further comprise executable code that, when executed by the one or more processors, causes the one or more processors to:
- determine an attack type of the subsequent request; and
- send a deceptive response to the subsequent request, the deceptive response formatted consistently with the attack type of the subsequent request.

14. The computer readable medium of claim 12, wherein the honeytrap comprises a false uniform resource identifier (URI), and the engagement with the honeytrap in the subsequent request is a request to access the false URI.

15. The computer readable medium of claim 12, wherein the honeytrap comprises a false credential, and the engagement with the honeytrap in the subsequent request further comprises a request to access a resource using the false credential.

16. The computer readable medium of claim 12, wherein the response is modified in response to detecting the user identifier associated with the request is suspicious based on a behavioral analysis of a plurality of requests from the user identifier.

17. A network traffic management apparatus, comprising memory comprising programmed instructions stored thereon and one or more processors configured to be capable of executing the stored programmed instructions to:
- intercept a response from a network application and destined for a client, the response sent in response to a request associated with a user identifier;
- determine that the user identifier associated with the request is a suspicious or malicious user identifier;
- based on the determination, forward a modified response to the client, the modified response comprising a honeytrap embedded within the intercepted response, wherein the honeytrap comprises a deceptive payload inserted into the intercepted response that appears useful to an attacker when the deceptive payload is modified during an attack of the network application;
- detect engagement with the honeytrap in a subsequent request to the network application, wherein the detecting comprises detecting a modified version of the deceptive payload in the subsequent request; and
- in response to detecting the engagement with the honeytrap, store an indication that the user identifier is malicious.

18. The network traffic management apparatus of claim 17, wherein the programmed instructions stored thereon and one or more processors are further configured to be capable of executing the stored programmed instructions to:
- determine an attack type of the subsequent request; and
- send a deceptive response to the subsequent request, the deceptive response formatted consistently with the attack type of the subsequent request.

19. The network traffic management apparatus of claim 17, wherein the honeytrap comprises a false uniform resource identifier (URI), and the engagement with the honeytrap in the subsequent request further comprises a request to access the false URI.

20. The network traffic management apparatus of claim 17, wherein the response is modified in response to detecting the user identifier associated with the request is suspicious based on a behavioral analysis of a plurality of requests from the user identifier.

* * * * *